Patented Sept. 21, 1926.

1,600,277

UNITED STATES PATENT OFFICE.

GEORGE HOLLAND ELLIS, FRANCIS MALCOLM STEVENSON, AND CYRIL MANSLEY CROFT, OF SPONDON, NEAR DERBY, ENGLAND, ASSIGNORS TO AMERICAN CELLULOSE AND CHEMICAL MANUFACTURING COMPANY, LIMITED, A CORPORATION OF DELAWARE.

DYEING OF CELLULOSE ACETATE.

No Drawing. Application filed September 15, 1924, Serial No. 737,903, and in Great Britain October 11, 1923.

This invention relates to the dyeing (which term likewise includes printing and stencilling) of yarns or threads, filaments, fabrics, films or other products made of or containing cellulose acetate, all hereinafter included in the term materials comprising cellulose acetate.

Known dyestuffs, having valuable properties for dyeing animal fibres such as wool and silk, consist of sulpho derivatives of pyrazolone compounds. Such dyestuffs, however, have little or no affinity for acetyl cellulose. Thus for example parasulpho benzene-azo-1-para-sulphophenyl-3-methyl-5-pyrazolone has no affinity for acetyl cellulose under ordinary dyeing conditions, while the corresponding monosulphonic acid, namely benzene-azo-1-para-sulpho-phenyl-3-methyl-5-pyrazolone, has only inferior affinity.

We have now found that derivatives of the pyrazolone series containing no sulpho groups, and in particular non-sulphonated azo derivatives of pyrazolone compounds, such for example as bodies produced by the action of diazotized non-sulphonated amino bases on non-sulphonated derivatives of the pyrazolone series, or equivalently, have very good affinity for cellulose acetates, and may be usefully employed for the dyeing or otherwise colouring of cellulose acetates.

According to the invention we effect the dyeing, printing or stencilling of threads, yarns, films or other materials or articles consisting wholly or partly of cellulose acetate with the aid of derivatives of pyrazolone compounds, and in particular of azo derivatives of pyrazolone compounds, said derivatives containing no sulpho groups in their constitution.

Azo derivatives such as referred to, may for example be obtained by coupling a pyrazolone, such as 3-methyl-1-phenyl-5-pyrazolone, 1:3-dimethyl-5-pyrazolone or other non-sulphonated pyrazolone or derivatives of pyrazolones, containing no sulpho groups, with diazotized non-sulphonated amino compounds. The invention however is not limited in respect of the method of making the pyrazolone derivatives.

Some examples of the non-sulphonated azo derivatives are for instance:

Benzene azo-1-phenyl-3-methyl-5-pyrazolone, made by diazotizing aniline and combining same with 1-phenyl-3-methyl-5-pyrazolone.

Para methoxy benzene azo-1-phenyl-3-methyl-5-pyrazolone, made by diazotizing para anisidine and combining same with 1-phenyl-3-methyl-5-pyrazolone.

Dimethyl para amino benzene azo benzene azo-1-phenyl-3-methyl-5-pyrazolone, made by diazotizing para amino benzene azo dimethyl aniline and combining same with 1-phenyl-3-methyl-5-pyrazolone.

It is understood that the invention is in no way limited to these examples and that other azo or other derivatives of the pyrazolone series, containing no sulpho groups, may be employed according to the invention.

Many of the non-sulphonated pyrazolone derivatives are soluble in aqueous alkalis, and may be so dissolved and applied in the usual ways for dyeing, printing or stencilling the materials in carrying out the invention, excess alkali being preferably avoided, to preclude saponification of the acetyl cellulose. Or the non-sulphonated pyrazolone derivatives may be dissolved in an organic solvent or solvent mixture which is miscible with water, the resultant solution being poured into water or added to the required bath.

The non-sulphonated pyrazolone derivatives may be employed in the form of soluble or more soluble modifications prepared by treating them with sulphoricinoleic acid or other sulphated fatty acids or other bodies of oily or fatty characteristics having salt forming groups capable of forming soluble salts with alkalis or ammonia or with salts of such acids or bodies, such for instance as their alkali or ammonium salts, that is to say by treating the non-sulphonated pyrazolone derivatives with solubilizing agents of the character referred to in the British Patent specification No. 219,349, French Patent specification 568,655 and U. S. application S. No. 664,780 filed 25th September, 1923. The sulphated fatty acids or other bodies of oily or fatty characteristics and the salts of such acids or bodies are especially useful solubilizing agents, and the same are all hereinafter in the claims included for simplicity in the term body of oily or fatty characteristics.

The non-sulphonated pyrazolone derivatives may however be applied in any suitable or convenient condition or way.

They may be applied with the aid of or in conjunction with protective colloids if desired.

When the non-sulpho derivatives of pyrazolone compounds applied on the material contain a free diazotizable amino group or groups, they may be developed on the fibre or material with the aid of any suitable developer.

Many of the non-sulphonated azo or other compounds, derivatives or colouring matters of the pyrazolone series have little or no affinity for cotton or other vegetable fibres or artificial silks of the cellulosic type, and they may therefore usefully be employed for producing either uniform or contrasting dyed effects on mixed materials of such fibres or artificial silks with acetyl cellulose, for instance according to the methods described in previous British specification No. 219,349, French specification 568,655 or U. S. application S. No. 664,780 or otherwise.

Many of the azo or other compounds, derivatives or colouring matters of the pyrazolone series containing no sulpho groups yield on acetyl cellulose shades very resistant to soap, acids, alkalis and often considerably resistant to light also.

The following are some examples illustrating how the invention may be carried into effect, it being understood that we in no way confine ourselves to the particular pyrazolone compounds or derivatives employed nor to the manner or details of operation.

Example 1.

Benzene azo-1-phenyl-3-methyl-5-pyrazolone made by diazotizing aniline and combining with 1-phenyl-3-methyl-5-pyrazolone may be applied by first dissolving in caustic alkalis, preferably avoiding excess of alkali, and pouring the resultant solution into a dyebath containing water. Dyeing is conducted as usual and exhaustion may be promoted by careful and progressive acidification of the dyebath. The shade yielded on acetyl cellulose is greenish yellow.

Example 2.

Para methoxy benzene azo-1-phenyl-3-methyl-5-pyrazolone, made by diazotizing para anisidine and combining with 1-phenyl-3-methyl-5-pyrazolone, may be dissolved by the aid of solubilizing agents having oily or fatty characteristics or salts of such bodies as indicated in the said prior British specification, No. 219,349, French specification 568,655 or U. S. application S. No. 664,780, or it may be dissolved by a combination of this method with the method given in example 1. The resultant solution is added to the dyebath containing water, dyeing being conducted as usual. The shade yielded on acetyl cellulose is golden yellow.

Example 3.

Dimethyl para amino benzene azo benzene azo-1-phenyl-3-methyl-5-pyrazolone, made by diazotizing para amino benzene azo dimethyl aniline and combining with 1-phenyl-3-methyl-5-pyrazolone may be dissolved in an organic solvent or mixture of such which is miscible with water (for example methylated spirits) and the resultant solution poured into a dyebath containing water, to which may be added, if desired, one or more protective colloids such as glue, starch, dextrine, and the like. Dyeing is conducted as usual. The shade yielded on acetyl cellulose is orange.

It is to be understood that we may if desired employ in conjunction with the azo or other derivatives of pyrazolone compounds, containing no sulpho groups, any dyestuffs, colouring matters or compounds having affinity for and capable of colouring acetyl cellulose, such dyestuffs, colouring matters or compounds being applied before, after or simultaneously with the application of the pyrazolone derivatives.

Further the invention may be applied for the dyeing of "mixed" yarns, threads or materials containing cellulose acetate associated with cotton, silk, wool artificial silks of the cellulosic type, or other fibres, natural or artificial.

In the case of "mixed" goods, these may be treated to yield either resist or uniform effects, dyestuffs suited to the non-cellulose-acetate portion of the goods being employed if desired. When mixed goods consisting of cellulose acetate and cotton or other cellulose fibre or artificial silks of the cellulose type (which we likewise include in the term cellulose fibre) are treated with the non-sulphonated pyrazolone derivatives alone, resist effects can be obtained, cellulose having little or no affinity for the unsulphonated pyrazolone derivatives.

What we claim and desire to secure by Letters Patent is:—

1. Process for dyeing yarns, fabrics and other materials comprising cellulose acetate, said process comprising applying to the materials a coloring matter which is a non-sulphonated derivative of the pyrazolone series.

2. Process for dyeing yarns, fabrics and other materials comprising cellulose acetate, said process comprising applying to the materials a coloring matter which is a non-sulphonated azo derivative of the pyrazolone series.

3. Process for dyeing yarns, fabrics and other materials comprising cellulose acetate, said process comprising applying to the materials a coloring matter which is a non-sulphonated azo derivative of 1-phenyl-3-methyl-5-pyrazolone.

4. Process for dyeing yarns, fabrics and other materials comprising cellulose acetate, said process comprising applying to the materials a coloring matter which is a non-sulphonated derivative of the pyrazolone series, said non-sulphonated coloring matter being applied in the form of a solubilized modification obtained by pre-treatment with a solubilizing agent comprising a body of oily or fatty characteristics.

5. Process for dyeing yarns, fabrics and other materials comprising cellulose acetate, said process comprising applying to the materials a coloring matter which is a non-sulphonated azo derivative of the pyrazolone series, said non-sulphonated coloring matter being applied in the form of a solubilized modification obtained by pre-treatment with a solubilizing agent comprising a body of oily or fatty characteristics.

6. Process for dyeing yarns, fabrics and other materials comprising cellulose acetate, said process comprising applying to the materials a coloring matter which is a non-sulphonated azo derivative of 1-phenyl-3-methyl-5-pyrazolone, said non-sulphonated coloring matter being applied in the form of a solubilized modification obtained by pre-treatment with a solubilizing agent comprising a body of oily or fatty characteristics.

7. Process for dyeing "mixed" yarns, fabrics and other materials comprising cellulose acetate associated with other fibre, said process comprising applying to the mixed material a coloring matter which is a non-sulphonated derivative of the pyrazolone series.

8. Process for dyeing "mixed" yarns, fabrics and other materials comprising cellulose acetate associated with other fibre, said process comprising applying to the mixed material a coloring matter which is a non-sulphonated derivative of the pyrazolone series for which said other fibre has less affinity than the cellulose acetate.

9. Process for dyeing "mixed" yarns, fabrics and other materials comprising cellulose acetate associated with cellulose fibre, said process comprising applying to the mixed material a coloring matter which is a non-sulphonated derivative of the pyrazolone series.

In testimony whereof they have hereunto subscribed their names.

GEORGE HOLLAND ELLIS.
FRANCIS MALCOLM STEVENSON.
CYRIL MANSLEY CROFT.